United States Patent [19]

Hennings et al.

[11] 4,244,830
[45] Jan. 13, 1981

[54] METHOD OF PRODUCING A DIELECTRIC WITH PEROWSKITE STRUCTURE AND CONTAINING A COPPER OXIDE

[75] Inventors: Detlev Hennings; Herbert Schreinemacher, both of Aachen, Fed. Rep. of Germany

[73] Assignee: U.S. Philips Corporation, New York, N.Y.

[21] Appl. No.: 24,811

[22] Filed: Mar. 28, 1979

Related U.S. Application Data

[63] Continuation of Ser. No. 863,224, Dec. 22, 1977, abandoned.

[30] Foreign Application Priority Data

Dec. 27, 1976 [DE] Fed. Rep. of Germany ....... 2659016

[51] Int. Cl.³ ............................................. H01B 3/12
[52] U.S. Cl. .................................. 106/39.5; 106/73.3; 106/73.31
[58] Field of Search .................... 252/63.2, 63.5, 520, 252/521; 106/39.5, 73.3, 73.31; 361/321, 322

[56] References Cited

U.S. PATENT DOCUMENTS

| | | | |
|---|---|---|---|
| 3,441,517 | 4/1969 | Braver et al. | 252/520 |
| 3,473,958 | 10/1969 | Waku | 106/73.31 X |
| 3,490,887 | 1/1970 | Herczog et al. | 252/63.5 X |
| 3,851,228 | 11/1974 | Sheard | 361/321 X |
| 3,977,887 | 8/1976 | McIntosh | 106/73.31 X |

*Primary Examiner*—Harris A. Pitlick
*Attorney, Agent, or Firm*—Marc D. Schechter

[57] ABSTRACT

Adding compounds which form in the temperature range of 1000° to 1250° C. the eutectics $CuO.Cu_2O$ or $CuO.Cu_2O\ Me^{IV}O_2$ to materials having a perowskite structure results in a reduction of the sintering temperature of the perowskite ceramic to between 1050° and 1185° C. For the perowskite ceramic the relevant materials are alkaline earth titanates, -zirconates, -stannates and mixed crystals thereof; $Me^{IV}O_2$ represents the oxides of the elements of group IV of the periodic system of elements.

7 Claims, 7 Drawing Figures

METHOD OF PRODUCING A DIELECTRIC WITH PEROWSKITE STRUCTURE AND CONTAINING A COPPER OXIDE

This is a continuation of application Ser No. 863,224, filed Dec. 22, 1977, now abandoned.

BACKGROUND OF THE INVENTION

The invention relates to a method of producing a dielectric having a perowskite structure, comprised of stoichiometrical alkaline earth titanates, alkaline earth zirconates, alkaline earth stannates and mixed crystals thereof.

It is known that sintered ceramic mixes consisting of barium titanate or mixed crystals of barium titanate with calcium titanate and barium zirconate or strontium titanate or barium stannate, such as (Ba, Ca) (Ti, Zr)$O_3$; Ba(Ti, Zr)$O_3$; Ba(Ti, Sn)$O_3$; (Ba, Sr)Ti$O_3$, are used as the dielectric in the production of ceramic capacitors. To obtain adequate ceramic densities, such materials must be sintered above 1300° C., often even at temperatures around 1400° C.

"Trans. Brit. Ceram. Soc." 74 (1975) No. 5, pages 165 to 169 discloses the use of admixtures of 0.5 mole % of copper to achieve dense sintering of barium titanate at sintering temperatures above 1200° C. in a reproducible manner.

The high sintering temperatures used in the present state of the art present several problems. These problems include the pronounced interaction of the material to be sintered with the very expensive refractory materials used during sintering, consisting of, for example, zirconium oxide, the considerable wear of the sintering furnaces and the relatively high energy cost.

SUMMARY OF THE INVENTION

It is an object of the invention to decrease the sintering temperature of alkaline earth titanates, -zirconates and -stannates or the mixed crystals thereof to such a level that the physical and, particularly, the dielectric properties of the sintered bodies are maintained but the manufacturing process of these sintered bodies becomes cheaper and simpler.

In accordance with the invention this is accomplished by adding to the stoichiometrical perowskite compound, eutectic forming compounds which, in practice, cannot be built into the perowskite lattice and which form the eutectic $CuO.Cu_2O$ or $CuO.Cu_2O.Me^{IV}O_2$ when sintered in an oxygen atmosphere, where $Me^{IV}O_2$ is at least an oxide of an element of group IV of the periodic system of elements (PSE), and by sintering the mixture of compounds at a partial oxygen pressure of 0.2–1 bar in the temperature range from 1000° to 1250° C.

The invention is based on the discovery that, in order not to change the electrical properties of the ceramic perowskite material, but rather improve them by means of an enlarged grain growth, the admixture to the perowskite compound should not be incorporated into the perowskite lattice to any substantial extent, but must be able to dissolve in the liquid state certain quantities of the fixed perowskite phase and to deposit them in solid form in a different place. "Not be incorporated into the perowskite lattice" to any substantial extent means that in ceramic perowskite material sintered at sintering temperatures <1200° C. the incorporation of elements from the eutectic-forming compounds in the crystal lattice cannot be detected and that in ceramic perowskite material sintered at sintering temperatures >1200° C. only traces of these elements can be detected in a quantity of <1%. This process might, as it were, be considered as crystal growth from the melt, which is performed here on a microscopic scale in a ceramic assembly, the eutectic melt being at the grain limits and dissolving the microscopic crystals of the ceramic material but substantially not penetrating into the crystals. This accelerated diffusion transport between the grains of the perowskite phase could be the reason for the increased grain growth and for the activated sintering behavior.

In accordance with further embodiments of the invention the eutectic forming compounds are each added in a quantity of 0.5–3 mole %. In the embodiment in which $CuO.Cu_2O.Me^{IV}O_2$ is to be formed, the $CuO.Cu_2O$-forming compounds and the $Me^{IV}O_2$-forming compounds are preferably added in a molar ratio of from 1:3 to 3:1.

In accordance with a further embodiment of the invention 50 mole % of the alkaline earth elements can be replaced by lead.

After mixing the starting materials which form the perowskite phase a calcining process in the temperature range of 1100° to 1200° C. can be performed.

Adding part of the copper to be added prior to the calcining process furnishes the advantage that the formation of mixed crystals, for example for Ba (Ti, Zr)$O_3$ is greatly facilitated. It is known that in the production of zirconium-containing mixed crystals, even at calcining temperatures of 1200° C. there is hardly any formation of mixed crystals, and in certain circumstances there is no complete conversion of the starting materials used in the build-up of the system. To achieve a high degree of mixed crystal formation a second calcining process is used in practice. With the method according to the invention a second calcining process is not necessary because a complete conversion of the starting materials used in the build-up of the system has already taken place at temperatures around 1100° C. and a formation of mixed crystals was initiated which has been completed to a large extent at 1200° C.

Additional advantages obtained with the method according to the invention include the fact in that compared to the known titanates, zirconates and stannates, relatively low temperatures will suffice for sintering the titanates, zirconates and stannates or the mixed crystals thereof, produced by means of the method according to the invention. Considerably cheaper refractories can therefore be used during sintering. At the same time, the choice regarding the fire-resistant materials for the refractories used during sintering becomes much wider. At the sintering temperatures required in the method according to the invention refractory materials can, for example, be used which have a particularly good heat conductivity, such as, for example, metal supports.

Barium titanate-(BaTi$O_3$) produced by means of the method according to the invention furnishes already, at sintering temperatures above 1000° C., coarse-crystalline dense structures having grain sizes of a diameter exceeding 50 μm and having densities of 98 to 99.5% of the theoretical density, which can be obtained with BaTi$O_3$ without the admixture only at sintering temperatures above 1320° C. As the grain size is decisive for the dielectric properties of the material, it is advantageous that with the method according to the invention grain structures can be controlled in a reproducible manner, whereas the grain growth is increased.

In addition, it is particularly advantageous that the good dielectric properties of ceramic sintered bodies consisting of mixes according to the invention, such as the dielectric constant ε and the value of the loss angle tan δ are not permanently affected by the admixture or even influenced in a positive sense; the values for tan δ are, for example, reduced in the case of barium titanate.

The addition of copper and of the further element(s) of group IV of the periodic system of elements can be done prior to and/or after calcination at 100°–1200° C., it being necessary that these materials are added to the ceramic material in as uniform a distribution as possible. This can be done either by adding bivalent copper oxide, or yet more effectively, by impregnating pre-sintered and ground ceramic powders with an aqueous copper solution, for example copper nitrate or copper acetate in solutions of water and ethanol. After impregnation of the powders, the powders must be baked in air for approximately one hour at approximately 700° C. This production stage can be omitted if copper (II) oxide is directly ground into the pre-sintered powder.

It appeared that the addition of copper for reducing the sintering temperature becomes much more effective if it is present in the ceramic powder together with a given quantity of at least one further element of group IV of the periodic system of elements. The further element(s) can be added in the form of its (their) oxide(s). Good results were obtained with titanium dioxide-($TiO_2$)-, zirconium dioxide-($ZrO_2$)-, tin dioxide-($SnO_2$)-hafnium dioxide-($HfO_2$), or lead dioxide ($PbO_2$)-; particularly favorable results were obtained with germanium dioxide-($GeO_2$)-and silicon dioxide-($SiO_2$). It is equally advantageous to add the quantities of these oxides, provided they form a main constituent of the perowskite phase ($TiO_2$, $ZrO_2$), after the calcining process to the stoichiometrically weighed-out perowskite phase of the barium titanate-($BaTiO_3$)-or of a mixed crystal, such as, for example (Ba, Ca)(Ti, Zr)$O_3$ together with the copper, or to add the quantity of these oxides prior to calcining. Very good results as regards an admixture of copper-titanium are achieved by impregnating the pre-sintered powders with a solution of titanium citrate and copper acetate in a solution of water and ethanol. Combinations of copper and titanium in the molar ratios Cu:Ti=1:3 to 3:1 appeared to be very suitable as a very active admixture for reducing the sintering temperature, optimum results being obtained with a ratio of 1:1 and a total concentration of 0.5 to 1 mole % Cu in the perowskite phase (in mixed crystals up to 2 mole % Cu).

BRIEF DESCRIPTION OF THE DRAWINGS

The invention will now be further explained with reference to the accompanying drawing and some examples, wherein.

DESCRIPTION OF THE PREFERRED EMBODIMENTS

The action of the various admixtures was measured by means of a dilatometer on the basis of the shrinkage of mechanically and hydrostatically pre-densified products which were pressed from powder. The samples were prismatic in shape and had dimensions of approximately 6.5×6.5×17 mm. The samples were heated in the dilatometer in air at a rate of approximately 4° C./minute to a maximum temperature of 1185° C. From these measurements the density of the samples was determined in % of the theoretical density ($\rho_{th}$) versus the temperature. The final density of the samples ($\rho_E$) was determined by measuring the hydrostatic upward pressure in water in so far as these samples had a closed porosity. The final density of samples having an open porosity was determined by determining the geometrical dimensions and the weight. The results of these measurements are shown in FIGS. 1 to 4 and in the tables 1 to 4, the density in % of the theoretical density $\rho_{th}$ being plotted on the vertical axis and the temperature in °C. being plotted on the horizontal axis; the warming-up rate was in all cases 3.9° C./min and the $T_{max}$ was 1185° C.

Figure 1:
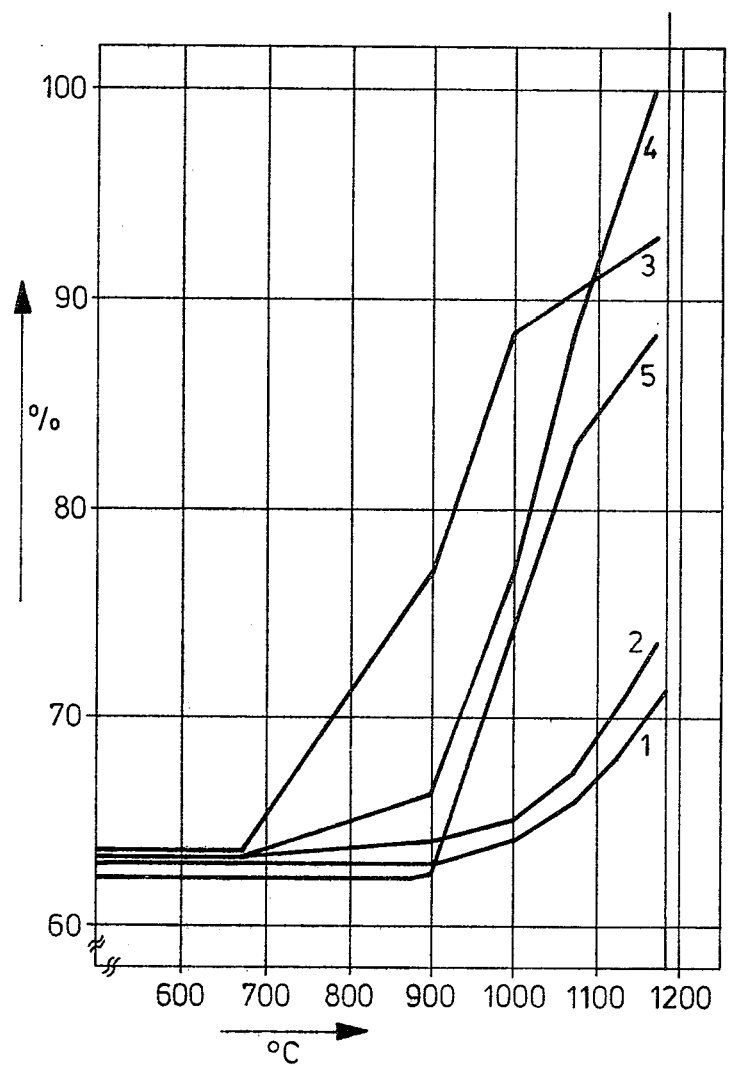
FIG. 1 is a graph of the densification of barium titanate-($BaTiO_3$-with different copper/titanium admixtures.

FIG. 1 shows the densification of mechanically and hydrostatically pressed barium titanic powders having an average grain size of approximately 0.5 μm with different copper/titanium admixtures at a warming-up rate of 3.9° C./min to a maximum temperature of 1185° C. in air. The densification is shown in % of the theoretical density $\rho_{th}$.

The curves 1 to 5 relate to the following materials:
1: $BaTiO_3$ + 1 mole % Ti-citrate
2: $BaTiO_3$ without admixture
3: $BaTiO_3$ + 1 mole % Cu-acetate
4: $BaTiO_3$ + 1 mole % Cu-acetate + 1 mole % Ti-citrate
5: $BaTiO_3$ + 1 mole % Cu-acetate + 3 mole % Ti-citrate.

All admixtures were added after pre-sintering at 1150° C. The curve 4 shows that the equimolar admixtures of Cu-acetate and Ti-citrate must be considered as the optimum for $BaTiO_3$.

Figure 2:
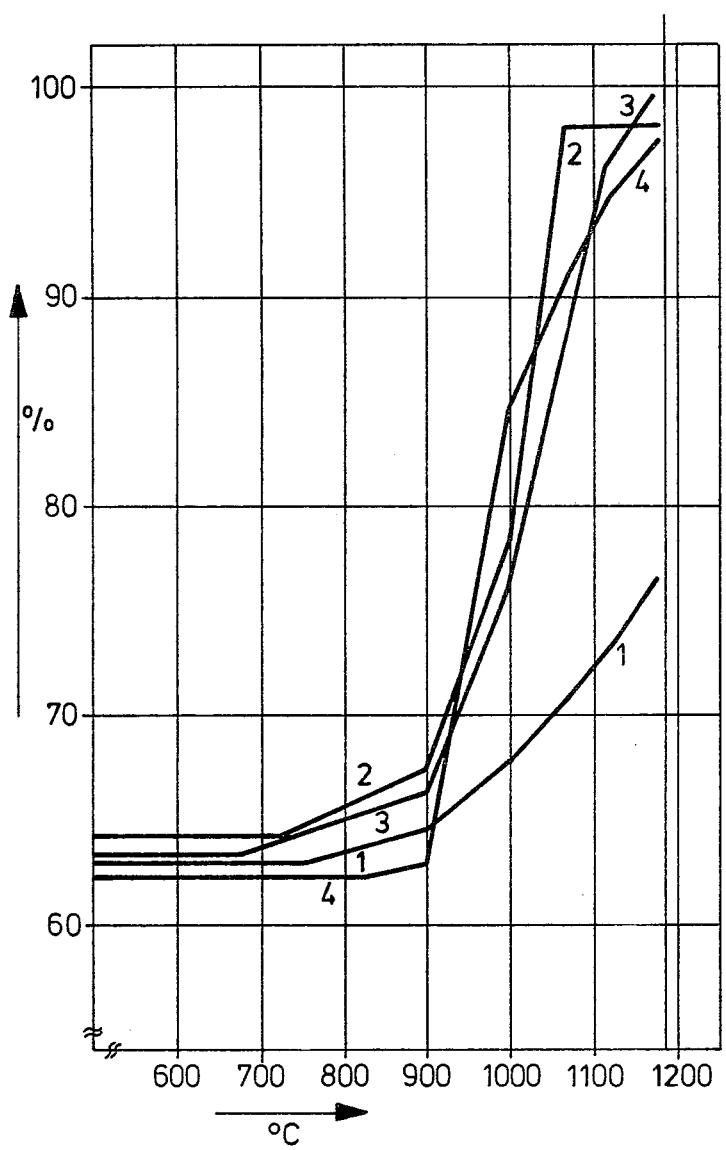
FIG. 2 shows a graph of the densification of barium-titanate-($BaTiO_3$)-with equimolar copper/titanium admixtures.

FIG. 2 shows the densification of mechanically and hydrostatically pressed barium titanate powders having an average grain size of approximately 0.5 μm versus the temperature at a warming-up rate of 3.9° C./min. The barium titanate powders were impregnated after calcining at 1150° C. with equimolar admixtures of Cu-acetate and Ti-citrate solutions. Also here the density is shown in % of the theoretical density $\rho_{th}$. The curves 1 to 4 relate to the following materials:

1: $BaTiO_3$ + 0.25 mole % Cu-acetate + 0.25 mole % Ti-citrate
2: $BaTiO_3$ + 0.5 mole % Cu-acetate + 0.5 mole % Ti-citrate
3: $BaTiO_3$ + 1 mole % Cu-acetate + 1 mole % Ti-citrate
4: $BaTiO_3$ + 2 mole % Cu-acetate + 2 mole % Ti-citrate.

The variations of these sintering curves show that the optimum total quantity of the added equimolar mixture of Cu-acetate and Ti-citrate amounts to 1 to 2 mole %.

Figure 3A:
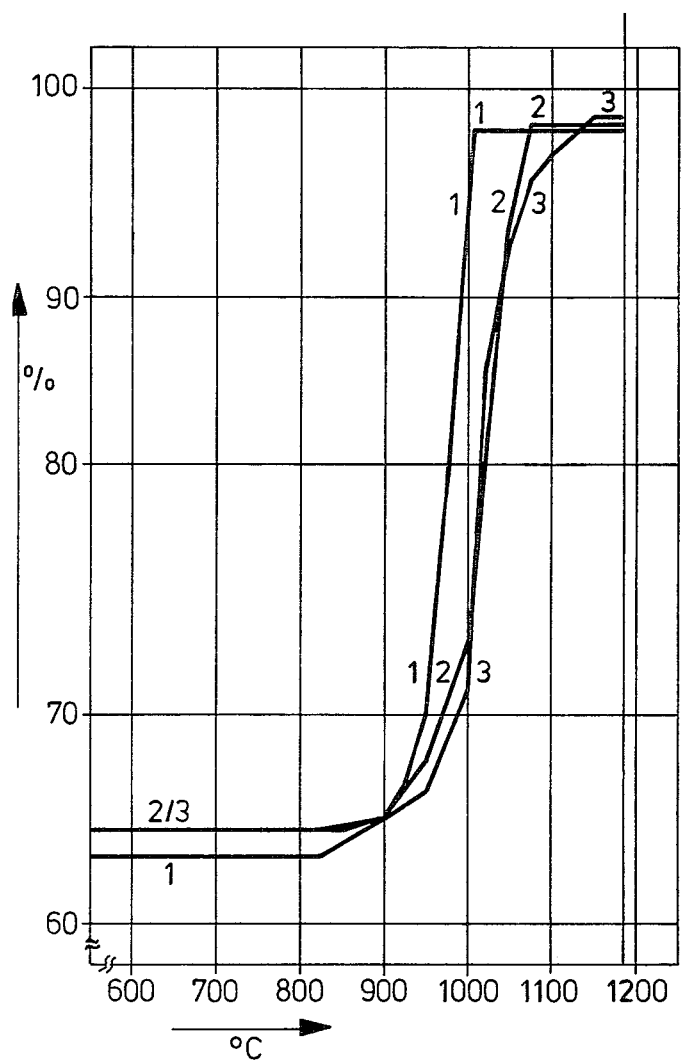
FIGS. 3a and 3b are graphs of the densification of barium titanate-($BaTiO_3$)-with admixtures of CuO and each time an oxide of an element of group IV of the periodic system of elements.
Figure 3B:
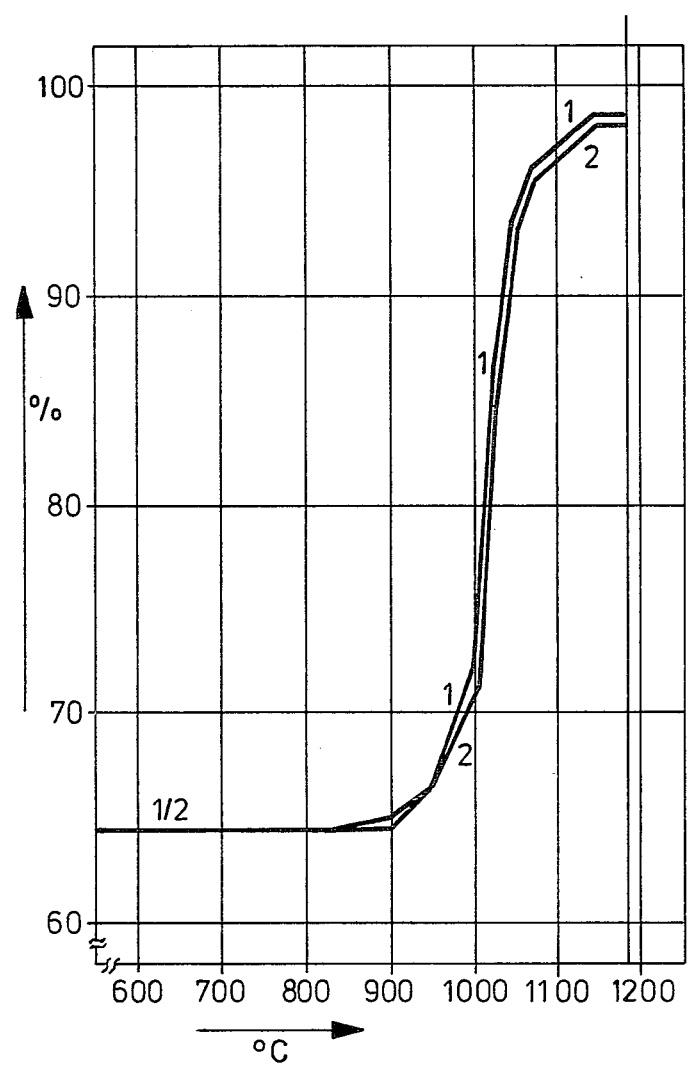

FIGS. 3a and 3b show the densification of mechanically and hydrostatically pressed powders of the barium titanate—($BaTiO_3$)—having an average grain size of approximately 0.5 μm versus the temperature at a warming-up rate of 3.9° C./min. After calcining at 1150° C. the mixed crystal powders were pulverized with equimolar quantities of CuO and an oxide of group IV of the periodic system of elements in an agate ball mill.

The curves 1 to 3 in FIG. 3a relate to the following materials:
1: $BaTiO_3$ + 1 mole % CuO + 1 mole % $GeO_2$
2: $BaTiO_3$ + 1 mole % CuO + 1 mole % $SiO_2$
3: $BaTiO_3$ + 1 mole % CuO + 1 mole % $SnO_2$.

Curves 1 and 2 in FIG. 3b relate to the following materials:
1: $BaTiO_3$ + 1 mole % CuO + 1 mole % $HfO_2$
2: $BaTiO_3$ + 1 mole % CuO + 1 mole % $ZrO_2$.

It will be clear from FIG. 3a that the combination $CuO/GeO_2$ shows the most pronounced effect of all the admixtures specified in the embodiments for reducing the sintering temperature. With an admixture of 1 mole % CuO + 1 mole % $GeO_2$ it was possible to sinter dense barium titanate ceramics at ~1000° C.

Figure 4A:
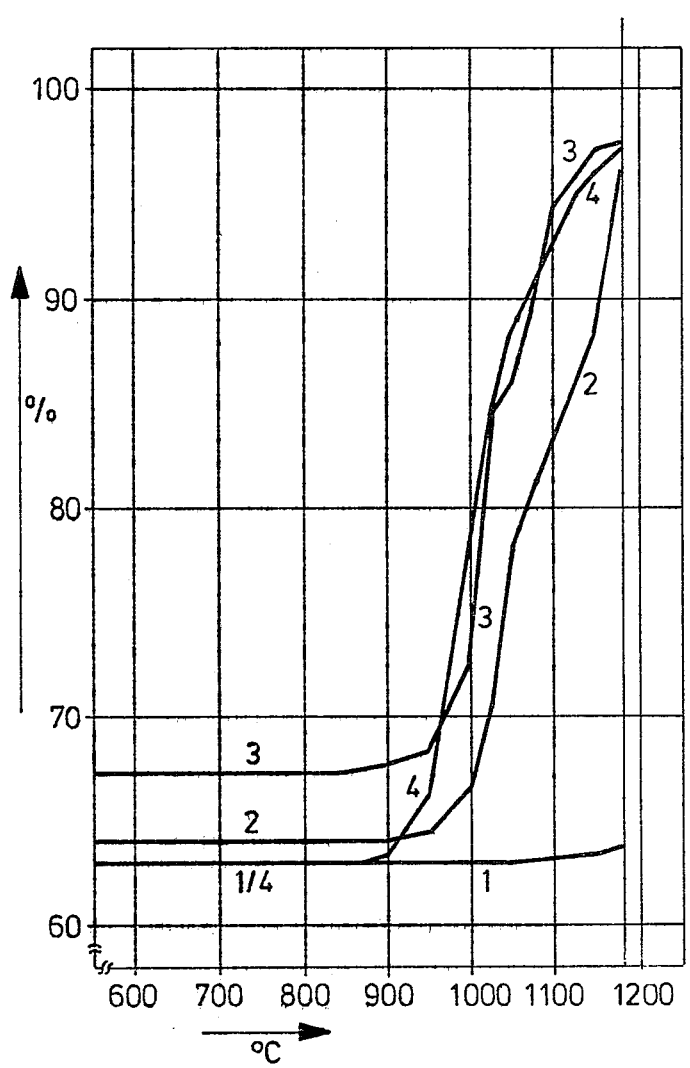
FIGS. 4a and 4b are graphs of the densification of mixed crystals of the barium titanate-($BaTiO_3$)-with different CuO/$TiO_2$ admixtures.
Figure 4B:
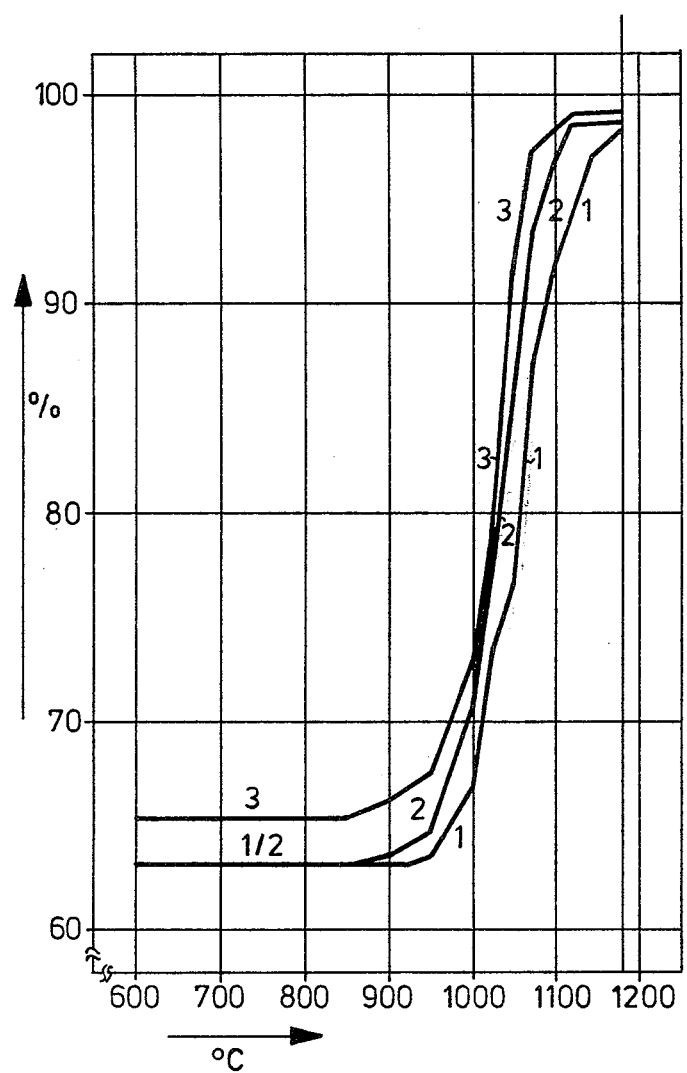

FIGS. 4a and 4b show the densification of mechanically and hydrostatically pressed powders of mixed crystals of barium titanate—($BaTiO_3$)—having an average grain size of approximately 0.5 μm versus the temperature at a warming-up rate of 3.9° C./min. After calcining at 1100° C. to 1200° C. the mixed crystal powders were pulverized with different admixtures of CuO and $TiO_2$ in an agate ball mill.

The curves 1 to 4 in FIG. 4a relate to the following materials:
1: $(Ba_{0.87}Ca_{0.13})(Ti_{0.88}Zr_{0.12})O_3$, without admixture
2: $(Ba_{0.87}Ca_{0.13})(Ti_{0.88}Zr_{0.12})O_3$ + 1 mole % CuO + 1 mole % $TiO_2$
3: $Ba(Ti_{0.78}Zr_{0.22})O_3$ + 1.5 mole % CuO + 1 mole % $TiO_2$
4: $(Ba_{0.85}Pb_{0.15})TiO_3$ + 0.5 mole % CuO + 0.5 mole % $TiO_2$.

Curves 1 to 3 in FIG. 4b relate to the following materials:
1: $(Ba_{0.9}Ca_{0.1})TiO_3$ + 0.5 mole % CuO + 0.5 mole % $TiO_2$
2: $(Ba_{0.68}Sr_{0.32})TiO_3$ + 0.5 mole % CuO + 0.5 mole % $TiO_2$
3: $Ba(Ti_{0.87}Sn_{0.13})O_3$ + 0.5 mole % CuO + 0.5 mole % $TiO_2$.

The following tables show the influence of different and equimolar admixtures of Cu-acetate and Ti-citrate or copper oxide and titanium dioxide or silicon dioxide, germanium dioxide, zirconium dioxide, tin dioxide, hafnium dioxide or lead dioxide respectively on the reduction in the sintering temperature of the following materials with perowskite structure:

Barium titanate—$BaTiO_3$;
strontium titanate—$SrTiO_3$;
calcium titanate—$CaTiO_3$;
barium zirconate—$BaZrO_3$;
calcium zirconate—$CaZrO_3$;
barium titanate zirconate—$Ba(Ti, Zr)O_3$;
barium titanate stannate—$Ba(Ti, Sn)O_3$;
barium-calcium titanate zirconate—$(Ba,Ca)(Ti,Zr)O_3$;
barium strontium titante $(Ba, Sr)TiO_3$;
barium leead titanate—$(Ba, Pb)TiO_3$;
barium calcium titanate—$(Ba, Ca)TiO_3$.

Table 1 shows the sintering results of barium titanate—($BaTiO_3$)—with different Cu/Ti admixtures. The sintering time of the samples sintered at 1050° C. was 10 hours and the sintering time of the samples sintered at 1185° C. was 200 minutes; the sintering atmosphere was air, partial oxygen pressure 0.2–1 bar.

Column 1 of the table (admixture in mole %) specifies:
(a) = admixture after calcining;
(b) = admixture prior to calcining;
Cu, Ti = admixture in the form of an aqueous or alcoholic solution;
CuO, $TiO_2$ = admixture in the form of oxide.

TABLE 1

Reduction of the sintering temperature of (Ba $TiO_3$) by different Cu/Ti-admixtures.

| (1) Admixture mole % | (2) warming-up rate °C./min | (3) max. sinter temp. °C. | (4) final density $p_E$ in % of $p_{th}$ |
|---|---|---|---|
| without admixture | 3.9 | 1185 | 82.4 |
| 1% Ti(a) | 3.9 | 1185 | 79.1 |
| 0.5% Cu(a) | 3.9 | 1185 | 92.3 |
| 1% Cu(a) | 3.9 | 1185 | 96.7 |
| 1% CuO(a) | 3.9 | 1185 | 93.1 |
| 0.25% Cu(a), 0.25% Ti(a) | 3.9 | 1185 | 86.9 |
| 0.5% Cu(a), 0.5% Ti(a) | 3.9 | 1185 | 99.2 |
| 0.5% Cu(a), 0.5% Ti(a) | 5.1 | 1050 | 99.2 |
| 0.5% CuO(a), 0.5% $TiO_2$(a) | 3.9 | 1185 | 99.2 |
| 0.5% CuO(a), 0.5% $TiO_2$(a) | 5.1 | 1050 | 99.2 |
| 0.5% Cu(a), 0.5% $TiO_2$(b) | 3.9 | 1185 | 99.0 |
| 1% Cu(a), 1% Ti(a) | 3.9 | 1185 | 99.2 |
| 1% CuO(a), 1% $TiO_2$(a) | 3.9 | 1185 | 98.7 |
| 1% CuO(a), 1% $TiO_2$(a) | 5.1 | 1050 | 97.0 |
| 1% CuO(a), 1% $TiO_2$(b) | 3.9 | 1185 | 98.3 |
| 1% Cu(a), 0.33% Ti(a) | 3.9 | 1185 | 94.2 |
| 1% Cu(a), 2% Ti(a) | 3.9 | 1185 | 98.5 |
| 1% Cu(a), 3% Ti(a) | 3.9 | 1185 | 93.8 |
| 2% Cu(a), 2% Ti(a) | 3.9 | 1185 | 98.8 |

It appears from table 1 that an admixture of 0.5 mole % Cu and 0.5 mole % Ti results in an optimum reduction of the sintering temperature for barium titanate. Ceramics having porosities below 1% are already obtained at a sintering temperature of 1050° C.

Table 2 shows the reduction in the sintering temperature of other materials with a perowskite structure after an admixture of CuO and $TiO_2$. The sintering time at the maximum temperature was 200 minutes; the sintering atmosphere was air, partial oxygen pressure 0.2–1 bar. For column (2) (admixture in mole %) the same applies as specified in table 1 for column (1).

TABLE 2

Reduction of the sintering temperature of materials having a perowskite structure by different $CuO/TiO_2$ admixtures.

| (1) Material | (2) Admixture mole % | (3) warming-up rate °C./min | (4) max. sinter temp. °C. | (5) final density $p_E$ in % of $p_{th}$ |
|---|---|---|---|---|
| $SrTiO_3$ | without admixture | 3.9 | 1185 | 71.8 |
| $SrTiO_3$ | 1% CuO(a), 1% $TiO_2$(a) | 3.9 | 1185 | 97.5 |
| $CaTiO_3$ | without admixture | 3.9 | 1185 | 70.5 |
| $CaTiO_3$ | 1% CuO(a), 1% $TiO_2$(a) | 3.9 | 1185 | 98.0 |
| $BaZrO_3$ | without admixture | 3.9 | 1185 | 69.7 |
| $BaZrO_3$ | 1% CuO(a), 1% $TiO_2$(a) | 3.9 | 1185 | 84.4 |
| $CaZrO_3$ | without admixture | 3.9 | 1185 | 68.9 |
| $CaZrO_3$ | 1% CuO(a), 1% $TiO_2$(a) | 3.9 | 1185 | 87.3 |

Table 2 shows that $CuO/TiO_2$-admixtures result in a considerable reduction of the sintering temperature with strontium titanate —($SrTiO_3$)— and calcium titanate —(CaTiO$_3$)—. For calcium zirconate —(CaZrO$_3$)— and barium zirconate —(BaZrO$_3$)— which can only be densely sintered without an admixture at a temperature above 1400° C., CuO/TiO$_2$-admixtures result in a reduction of the sintering temperature to ~1200° C. At this temperature a pronounced densification of the ceramic material is already obtained compared to a material without an admixture.

Table 3 shows the reduction of the sintering temperature in mixed crystal systems by means of different CuO/TiO$_2$ admixtures. The sintering time at the maximum temperature was 10 hours; the sintering atmosphere was air, partial oxygen pressure 0.2–1 bar. For column (2) of this table (admixture in mole %) the same applies as specified for column (1) in table 1.

TABLE 3

Reduction of the sintering temperature in mixed crystal systems by means of different CuO/TiO$_2$ admixtures.

| (1) Material | (2) Admixture mole % | (3) warming-up rate °C./min | (4) max. sinter-temp. °C. | (5) final density $p_E$ in % of $p_{th}$ |
|---|---|---|---|---|
| (Ba$_{0.87}$Ca$_{0.13}$) (Ti$_{0.88}$Zr$_{0.12}$)O$_3$ | 1% CuO(a) 1% TiO$_2$(a) | 5.1 | 1050 | 83.3 |
| " | " | 5.3 | 1080 | 86.6 |
| " | " | 5.5 | 1120 | 93.0 |
| " | " | 5.6 | 1150 | 96.2 |
| " | without admixture | 7 | 1430 | 96.6 |
| (Ba$_{0.92}$Ca$_{0.08}$) (Ti$_{0.81}$Zr$_{0.19}$)O$_3$ | 1.5% CuO(a), 1% TiO$_2$(a) | 5.1 | 1050 | 83.2 |
| " | " | 5.4 | 1100 | 87.2 |
| " | " | 5.6 | 1150 | 96.0 |
| " | " | 5.9 | 1200 | 95.3 |
| Ba(Ti$_{0.78}$Zr$_{0.22}$)O$_3$ | 1.5% CuO(a), 1% TiO$_2$(a) | 5.1 | 1050 | 88.9 |
| " | " | 5.4 | 1100 | 96.1 |
| " | " | 5.6 | 1150 | 97.4 |
| " | " | 5.9 | 1200 | 97.2 |
| (Ba$_{0.68}$Sr$_{0.32}$)TiO$_3$ | 0.5% CuO(a), 0.5% TiO$_2$(a) | 5.1 | 1050 | 95.7 |
| " | " | 5.4 | 1100 | 98.4 |
| " | " | 5.6 | 1150 | 99.0 |
| " | " | 5.9 | 1200 | 98.1 |
| Ba(Ti$_{0.87}$Sn$_{0.13}$)O$_3$ | 0.5% CuO(a), 0.5% TiO$_2$(a) | 5.1 | 1050 | 97.4 |
| " | " | 5.4 | 1100 | 98.5 |
| " | " | 5.6 | 1150 | 98.9 |
| " | " | 5.9 | 1200 | 98.7 |
| (Ba$_{0.85}$Pb$_{0.15}$)TiO$_3$ | 0.5% CuO(a), 0.5% TiO$_2$(a) | 5.3 | 1090 | 96.9 |
| " | " | 5.5 | 1130 | 98.6 |
| " | " | 5.9 | 1200 | 99.0 |
| (Ba$_{0.9}$Ca$_{0.1}$)TiO$_3$ | 0.5% CuO(a), 0.5% TiO$_2$(a) | 5.0 | 1030 | 89.3 |
| " | " | 5.1 | 1050 | 95.2 |
| " | " | 5.2 | 1070 | 94.8 |
| " | " | 5.9 | 1200 | 97.8 |

Table 4 shows the sintering results of barium titanate —(BaTiO$_3$)— with different admixtures. In addition to copper an element of group IV of the periodic system of elements was chosen as second admixture.

The sintering time was 200 minutes; the sintering atmosphere was air, partial oxygen pressure 0.2–1 bar. For column (2) of this table (admixture in mole %) the same applies as specified for column (1) in table 1.

TABLE 4

Reduction of the sintering temperature of barium titanate (BaTiO$_3$) -with different admixtures.

| Material | Admixture mole % | warming-up rate °C./min | max. temp. °C. | final density $p_E$ in % of $p_{th}$ |
|---|---|---|---|---|
| BaTiO$_3$ | without admixture | 3.9 | 1185 | 82.4 |
| " | 1% CuO(a), 1% ZrO$_2$(a) | 3.9 | 1185 | 98.8 |
| " | 1% CuO(a), 1% HfO$_2$(a) | 3.9 | 1185 | 98.5 |
| " | 1% CuO(a), 1% SiO$_2$(a) | 3.9 | 1185 | 98.2 |
| " | 1% CuO(a), 1% GeO$_2$(a) | 3.9 | 1185 | 98.0 |
| " | 1% CuO(a), 1% SnO$_2$(a) | 3.9 | 1185 | 98.5 |
| " | 1% CuO(a), 1% PhO$_2$(a) | 3.9 | 1185 | 96.0 |

From the values of tables 1 to 4 it appears that an admixture to said systems of copper or, preferably, copper and elements of group IV of the periodic system of elements results in a considerable reduction of the sintering temperature without, in particular the dielectric properties of these materials being affected adversely.

Figure 5:
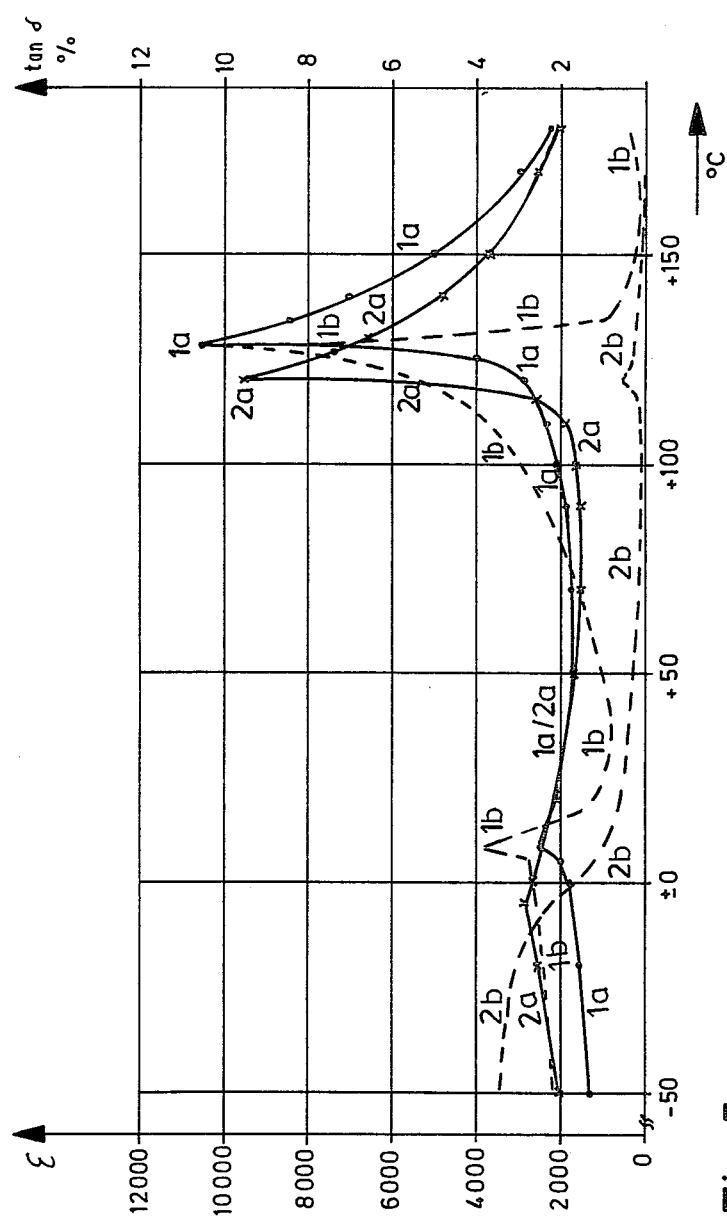
FIG. 5 is a graph of the dielectric properties of barium titanate—(Ba $TiO_3$)—with and without CuO-admixture.

FIG. 5 shows the dielectric properties of barium titanate —(BaTiO$_3$)— with and without CuO-admixture.

The measurements of the relative dielectric constant $\epsilon$ and of the loss angle tan$\delta$ were performed in the temperature range of $-50°$ C. to $+180°$ C. with an a.c. voltage of 1 V (peak-peak) at a frequency of 1 kHz on disc-shaped samples having a diameter of 5 mm and a thickness of 0.5 mm which were cut from sintered prismatic ceramic blocks. The electrodes were vapor-deposited chromium-nickel and gold layers.

The curves 1a, 1b, 2a and 2b in FIG. 5 relate to the following materials and measuring values:

1a: (solid line)$\epsilon$(versus the temperature) of BaTiO$_3$+1 mole % TiO$_2$; sintering time 5 hours; sintering temperature 1340° C.; sintering atmosphere air: partial oxygen pressure 0.2–1 bar; average grain size of the samples 50 to 70 $\mu$m.

1b: (dashed line)tan$\delta$(versus the temperature) for the same material as in curve 1a.

2a: (solid line)$\epsilon$(versus the temperature) of BaTiO$_3$+0.5 mole % CuO+0.5 mole % TiO$_2$; sintering time 200 minutes; sintering temperature 1185° C.; sintering atmosphere air; partial oxygen pressure 0.2–1 bar; average grain size of the samples 50 to 70 $\mu$m.

2b: (dashed line)tan$\delta$(versus the temperature) for the same material as in curve 2a.

It appeared from a comparison between the measuring curves 1a and 2a that a CuO/TiO$_2$-admixture does not substantially affect the values for the dielectric constant $\epsilon$ for BaTiO$_3$ in the range of $-50°$ to $+100°$ C. However, from a comparison between the measured values for the loss angle tan$\delta$ in accordance with curves 1b and 2b it appears that a CuO/TiO$_2$ admixture in the temperature range of $-10°$ C. to $+180°$ C. effects a drastic reduction in the dielectric losses relative to barium titanate —(BaTiO$_3$)— without admixture, which must be considered as a great advantage.

The following starting materials were used for producing sample specimens from titanates, zirconates, stannates or mixed crystals thereof with the desired admixtures.

BaCO$_3$, analytical reagent
SrCO$_3$, analytical reagent
CaCO$_3$, analytical reagent PbO, analytical reagent
TiO₂, maximum purity
SnO₂, maximum purity
CuO, analytical reagent
Cu(CH₃COO)₂.H₂O, analytical reagent
HfO₂, analytical reagent
SiO₂, silicagel 60, maximum purity (subsequently micronised)
GeO₂, maximum purity
PbO₂, maximum purity
Titanium tetrabutylate Titanium tetrabutylate was used to represent titanium citrate; the procedure followed was in accordance with the preparation instruction from American Ceram. Soc. Bull. 49 (1970), pages 990–993. "Preparation of BaTiO₃ and other white ceramic powders by coprecipitation of an alcohol".

The required quantities of weighed-out starting materials were placed in agate ball jars and suspended with denatured ethanol. After the addition of a suitable number of agate grinding balls a mixing process was performed during two hours in a planetary ball mill. Thereafter the mixtures were dried under a surface evaporator and calcined for 15 hours in air. For zirconium-containing materials the calcining temperature was 1200° C. and for all other materials 1150° C.

After a dry grinding process during one hour in the planetary ball mill, copper and an element from group IV of the periodic system of elements were added.

To this end either the corresponding oxide (cf. the enumeration of starting materials) or aqueous solutions of the elements to be added were used, in particular with Cu/Ti admixtures.

When adding oxide, to the admixture of CuO+TiO₂ or instead of TiO₂: ZrO₂, SnO₂, HfO₂, SiO₂, GeO₂ or PbO₂, the following procedure was followed:

The pre-sintered and ground perowskite material was mixed together with the oxide to be added in the same circumstances as the weighed-out quantities of starting materials prior to the sintering process. After drying under a surface evaporator an additional dry grinding operation in a planetary ball mill took place during 15 minutes.

The following procedure was followed for adding aqueous solutions of the elements to be added, copper acetate and titanium-citrate in particular:

The required volumes of a 0.25 m copper acetate solution and of a 0.25 m titanium citrate solution were added and diluted with denaturated ethanol in a ratio of approximately 1:1. The clear solution was added to the calcined and ground perowskite material. While being stirred continuously and with a simultaneous supply of hot air the suspensions dried out quickly. Thereafter the impregnated powders were baked for one hour at 700° C. in air in order to burn the organic constituents. Finally these powders were also milled dry for 15 minutes in the planetary ball mill.

Sample specimens were pressed from the ceramic powders thus prepared at a pressure of 4000 bars and sintered in the circumstances specified in the tables 1 to 4.

What is claimed is:

1. A method of producing a dielectric material comprising perowskite-forming compounds consisting essentially of one or more of the group of stoichiometrical alkaline earth titanates, alkaline earth zirconates, alkaline earth stannates and mixed crystals thereof, said method comprising the steps of:

admixing, with said perowskite-forming compounds, a quantity of eutectic-forming compounds which cannot be incorporated into the perowskite lattice to any substantial extent and which are capable of forming $CuO.Cu_2O$ or $CuO.Cu_2O.Me^{IV}O_2$ when sintered in an oxygen atmosphere, where $Me^{IV}O_2$ is at least one oxide of an element from group IV of the periodic system of elements; and sintering said admixture, at a partial oxygen pressure of 0.2–1 bar, in the temperature range of 1000° C. to 1250° C.;

said eutectic-forming compounds being present in sintering temperature lowering amounts.

2. A method as claimed in claim 1, wherein the eutectic forming compounds are each added in a quantity of 0.5 to 3 mole %.

3. A method as claimed in claim 1, wherein the $CuO.Cu_2O$-forming compounds and the $Me^{IV}O_2$-forming compounds are present in a molar ratio of 1:3 to 3:1.

4. A method as claimed in claim 1, wherein up to 50 mole % of the alkaline earth elements which are part of the perowskite phase can be replaced by lead.

5. A method as claimed in claim 1, further comprising the step of calcining the perowskite forming compounds, in the temperature range of 1100° C. to 1200° C., prior to the step of admixing.

6. A method as claimed in claim 5, wherein prior to the step of calcining, there is further provided the step of adding, to the perowskite forming compounds, at least a part of the copper to be added, up to 1 mole % as an oxide or as a water-soluble compound in the form of a water/ethanol solution, or at least part of the $Me^{IV}$ to be added in the form of at least one of the elements titanium, zirconium, tin, hafnium or lead as an oxide.

7. A method as claimed in claim 5, wherein after the step of calcining, there is further provided the step of adding copper and at least one of the elements silicon, titanium, germanium, zirconium, tin, hafnium or lead as an oxide to the perowskite-forming compounds.

* * * * *